(No Model.)
W. STAMP.
CAR COUPLING.
No. 292,704. Patented Jan. 29, 1884.
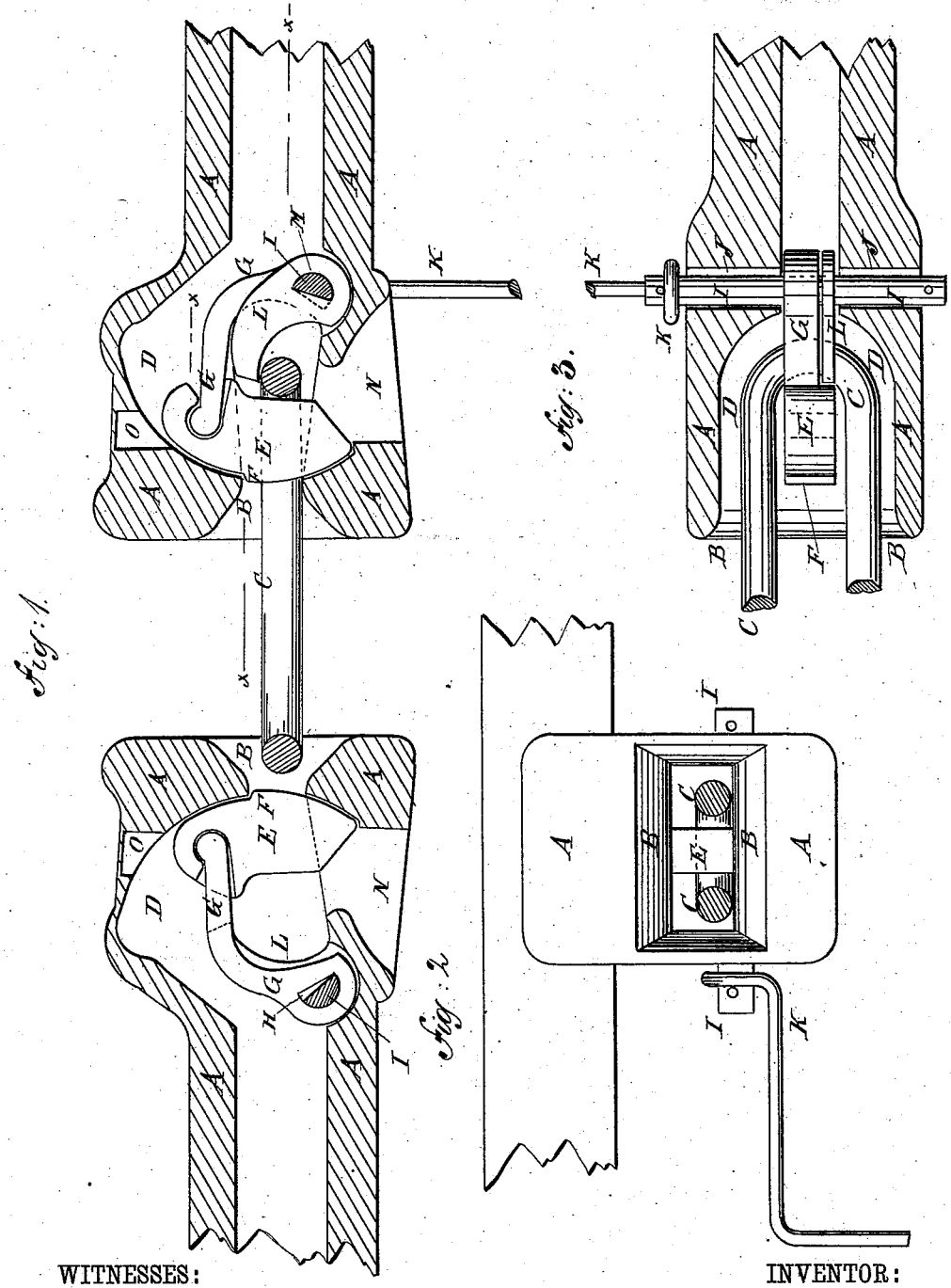
WITNESSES:
Chas. Nias
C. Sedgwick
INVENTOR:
W. Stamp
BY Munn & Co
ATTORNEYS.

UNITED STATES PATENT OFFICE.

WILLIAM STAMP, OF SUSQUEHANNA DEPOT, PENNSYLVANIA.

CAR-COUPLING.

SPECIFICATION forming part of Letters Patent No. 292,704, dated January 29, 1884.

Application filed September 15, 1883. (No model.)

*To all whom it may concern:*

Be it known that I, WILLIAM STAMP, of Susquehanna Depot, in the county of Susquehanna and State of Pennsylvania, have invented a new and useful Improvement in Car-Couplings, of which the following is a full, clear, and exact description.

Reference is to be had to the accompanying drawings, forming a part of this specification, in which similar letters of reference indicate corresponding parts in all the figures.

Figure 1 is a sectional side elevation of my improved car-coupling. Fig. 2 is a front elevation of a part of the same, the link being shown in section. Fig. 3 is a sectional plan view of a part of the coupling, taken through the broken line *x x x*, Fig. 1.

The object of this invention is to facilitate the coupling and uncoupling of cars and promote convenience and safety in operating car-couplings.

The invention consists in a car-coupling constructed with a draw-head having large interior space, in which is placed a coupling-pin having a shoulder to engage with the draw-head and connected by a curved arm with a semi-cylindrical shaft pivoted to the draw-head and provided with a crank whereby the cars will be coupled automatically and can be readily uncoupled. The hole in the coupling-pin arm that receives the semi-cylindrical shaft is made larger than the said shaft, and with the said shaft is connected a curved arm to rest upon the inner end of the coupling-link, so that the said link can be readily guided to enter the draw-head of an adjacent car, as will be hereinafter fully decribed.

A is the draw-head of the coupling, which is designed to be connected with the car in the ordinary manner. The mouth B of the draw-head A is made hopper-shaped to guide an entering link, C, into place.

Within the draw-head A is formed a large space, D, to receive the pin E and allow the said pin to move up and down in coupling and uncoupling the cars. The forward and upper sides of the space D are curved in the arc of a circle, and the forward side of the pin E is correspondingly curved, so that the said pin E can readily move up and down in the arc of a circle.

Upon the forward side of the pin E is formed a shoulder, F, which, when the said pin is down, rests against the draw-head A at the upper side of its throat, as shown in Fig. 1, to prevent the said coupling-pin from rising when in use.

G is an arm, the forward end of which is formed solid with the coupling-pin E, or is inserted in a socket formed in the upper rear part of the said pin E. The rear part of the arm G is curved downward, and its rear end is enlarged and has a semicircular hole, H, formed through it to receive the semi-cylindrical shaft I, which passes through a round hole, J, in the draw-head A. The hole H is made larger than the shaft I, so that the said shaft can have a slight rotary movement within the said hole. The hole J is made larger than the shaft I, so that the entire draft-strain will come upon the forward part of the draw-head A.

To the end of the shaft I is attached a crank, K, the shank of which is made of such a length that the arm of the said crank will be about in line with the side of the car-body, so that the said crank can be operated from the side of the track.

At the side of the arm G is placed an arm, L, which has a semicircular hole, M, in its rear end to receive the shaft I. The arm L is curved forward and downward, and is made of such a length that its forward end will rest upon the inner end of the link C. With this construction, by a slight movement of the crank K the outer end of the link C can be raised more or less to guide the said link into the mouth of the draw-head of an adjacent car, the enlarged hole H in the arm G allowing this to be done without moving the pin E. When the cars are run together, the end of the entering link C strikes the pin E and pushes it back far enough to free the shoulder F from the draw-head A, and then forces the said pin upward and passes its lower end, the said pin dropping through the said link by its own weight, coupling the cars. The pin E is raised to uncouple the cars by operating the crank K.

In the lower side of the draw-head A is formed an opening, N, of such a shape and size that the coupling-pin E and its arm G can be passed in and out freely, so that should the pin E or arm G break they can be removed and replaced by new ones by simply withdrawing the shaft I and without detaching the draw-head.

In the upper part of the draw-head A is formed a cylindrical recess, O, extending from the space D nearly to the top of the said draw-head, and in such a position that its forward side will be in line with the forward side of the opening N, so that should the pin E or arm G break where there are no new parts to replace it, the metal above the recess O can be broken away and the coupling made with an ordinary coupling-pin.

Having thus described my invention, I claim as new and desire to secure by Letters Patent—

1. A car-coupling constructed substantially as herein shown and described, and consisting of the draw-head A, having large interior space, the coupling-pin E, having shoulder F and curved arm G, and the semi-cylindrical shaft I, as set forth.

2. In a car-coupling, the coupling-pin E, made substantially as herein shown and described, with a shoulder, F, to prevent accidental uncoupling, and an arm, G, to connect with an uncoupling-shaft, as set forth.

3. In a car-coupling, the combination of the semi-cylindrical shaft I and the coupling-pin arm G, having a semicircular hole, H, larger than the said shaft of the arm L, substantially as herein shown and described, whereby the said arm can be operated by the said shaft to guide the coupling-link without moving the coupling-pin, as set forth.

4. In a car-coupling, the combination, with the semi-cylindrical shaft I, carrying the arm G of the coupling-pin, of the crank K, substantially as herein shown and described, whereby the cars can be uncoupled from the side of the track, as set forth.

WILLIAM STAMP.

Witnesses:
CHARLES A. MILLER,
HERVEY HOLDRIDGE.